United States Patent [19]

Hiatt

[11] Patent Number: 4,522,611

[45] Date of Patent: Jun. 11, 1985

[54] SPROCKET ASSEMBLY WITH REPLACEABLE TEETH

[75] Inventor: David M. Hiatt, Portland, Oreg.

[73] Assignee: Esco Corporation, Portland, Oreg.

[21] Appl. No.: 453,799

[22] Filed: Dec. 27, 1982

[51] Int. Cl.³ .............................................. F16H 55/12
[52] U.S. Cl. .................................... 474/162; 474/152
[58] Field of Search ................... 474/162, 152, 163; 74/447, 448, 460; 29/159 R, 402.08

[56] References Cited

U.S. PATENT DOCUMENTS

| | | | |
|---|---|---|---|
| 382,079 | 5/1888 | Ewart | 474/163 |
| 809,421 | 1/1906 | Boon | 474/54 |
| 1,630,313 | 5/1927 | Rorabeck | 474/162 |
| 2,863,323 | 12/1958 | Shaffer | 474/162 |

FOREIGN PATENT DOCUMENTS 623564 10/1961 Canada ............................ 474/163
16697 of 1893 United Kingdom .

Primary Examiner—Stephen J. Novosad
Assistant Examiner—Frank H. McKenzie, Jr.
Attorney, Agent, or Firm—Tilton, Fallon, Lungmus & Chestnut

[57] ABSTRACT

A sprocket assembly with replaceable teeth including a generally cylindrical sprocket equipped with a plurality of L-shaped pockets in the periphery thereof for the receipt of a tooth having an inner end equipped with a partial T-shape and wherein wedge lock means operate against the T-shape to cooperate with the chain force in maintaining the seat of the tooth within the pocket.

17 Claims, 5 Drawing Figures

SPROCKET ASSEMBLY WITH REPLACEABLE TEETH

BACKGROUND AND SUMMARY OF INVENTION

This invention relates to a sprocket assembly with replaceable teeth and, more particularly one wherein the securement of the teeth not only is substantially free of chain stress but further cooperates with the force of the chain in enhancing the tooth securement.

Although the sprocket assemblies of the invention have wide application, they are particularly suited for use in pulp mill conveyors where the wearing stresses are extraordinary. This has necessitated the use of very large sprockets of the order of 25" pitch diameters (632 mm). Thus, sprocket replacement is costly and time-consuming.

The instant invention provides three significant advantages over prior sprocket assemblies employed in the pulp mill arduous operation: (1) the ability of tooth replacement without disassembly of the chain and sprocket, (2) the operation of the assembly without stress on the tooth lock, and (3) the ability to provide both the teeth and the sprocket without machining—except for the sprocket bore.

The first advantage has been long known—see for example U.S. Pat. Nos. 259,875; 358,771; 1,206,172 and 1,630,313. However, none of these achieve the additional advantages of the invention and further, notwithstanding the long availability of structures teaching the advantage of replacement without chain disassembly, this is has not been realized in the intervening art as exemplified by U.S. Pat. Nos. 2,863,323; 3,311,220; 3,439,555 and 4,109,545.

The instant invention achieves these cooperative advantages by utilizing a replaceable tooth having inward of the usual chain engaging contour, a circumferentially related toe part and heel part for mounting within a pocket inward of the periphery of the generally cylindrical sprocket. Lock means are provided in axial passages in the sprocket associated with the heel part so that the chain force and lock force both cooperate to firmly seat the tooth toe part within the pocket and thus relieve the lock any function except to maintain the tooth on the sprocket when there is no chain force.

Other objects and advantages of the invention may be seen in the ensuing specification.

The invention is described in conjunction with an illustrative embodiment, in which—

Figure 1:
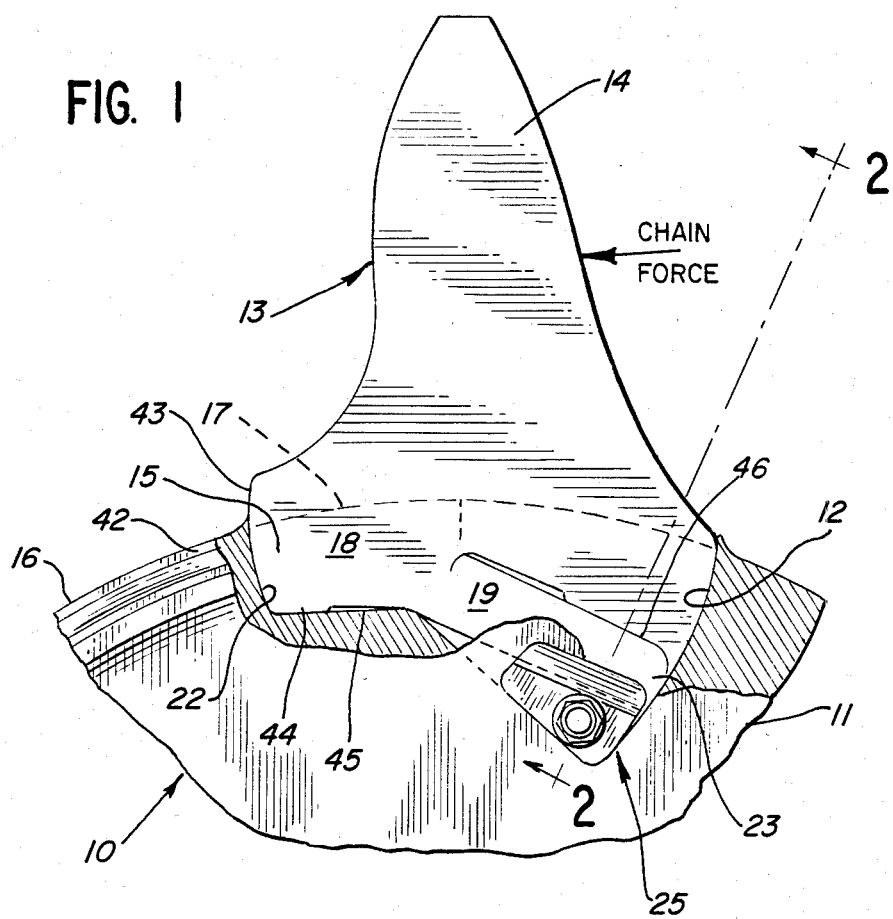
FIG. 1 is a fragmentary elevational view, partially in section showing the mounting of one tooth in a portion of the sprocket.

In the illustration given and with reference first to FIG. 1, the numeral 10 designates generally a sprocket assembly which is seen to include a sprocket 11 equipped with a plurality of pockets 12 (only one of which is seen in FIG. 1). The numeral 13 designates generally the inventive tooth, again a plurality of which are provided, and which is seen to include an outer end 14 adapted to engage a chain (not shown) and an inner end 15 which is adapted to be received within the pocket 12. The sprocket 11 is generally cylindrical in construction and has the usual central bore (not shown).

The cylindrical periphery 16 of the sprocket 11 is interrupted as at 17 to provide an opening for the insertion of the inner end 15 of the tooth 13. The tooth 13 has a toe part 18 (still referring to FIG. 1) which is located forwardly in the direction of chain force and a heel part 19 which is rearward of the toe part (again considered from the standpoint of the chain force). The heel part 19 (see FIG. 2) is further characterized by being equipped with integral, axially extending flanges as at 20 and 21.

The pocket 12 is contoured to receive the inner end 15 of the tooth 13 and forwardly is equipped with a toe portion 22 and rearwardly with a heel portion 23. The heel portion is partially defined by the perimetric wall 24 (see FIG. 3). Also, as can be appreciated from a consideration of FIG. 2, the wall 24 provides a radially outer confinement for the flanges 20 and 21.

Figure 3:
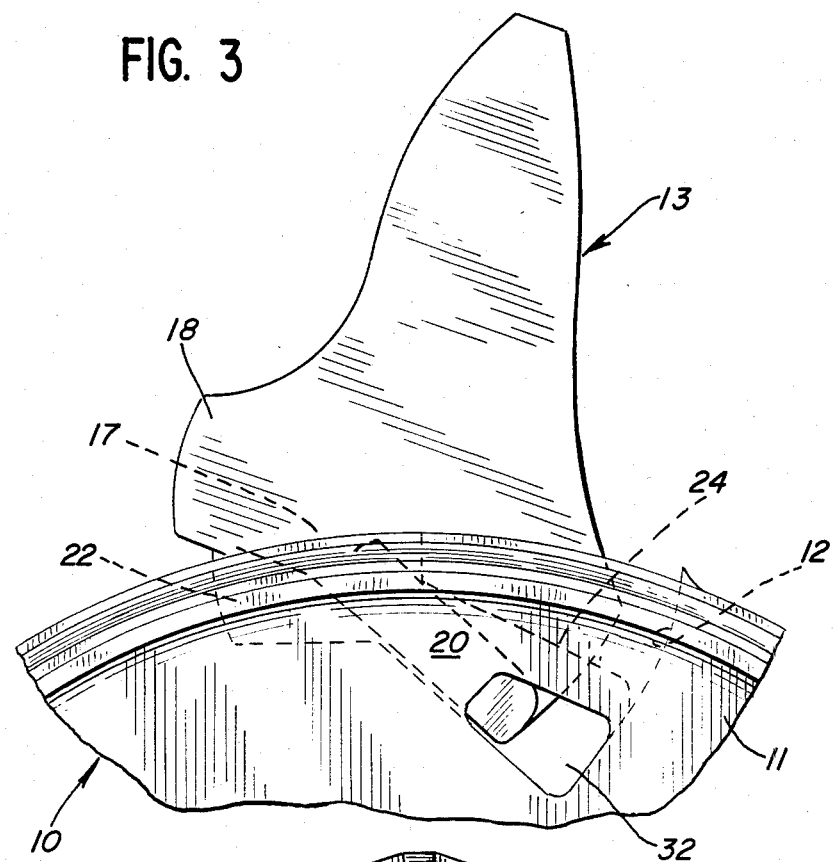
FIG. 3 is a view similar to FIG. 1 but showing the tooth in the process of being installed within a pocket of the sprocket.

The structure of the tooth 13 and pocket 12 can also be appreciated from a consideration of FIG. 3.

Referring to FIG. 3, it is seen that the tooth 13 is in the process of being inserted into the pocket 12 and is tilted somewhat from its final seated position as seen in FIG. 1. The flange 20 is seen to have been inserted into the opening 17 and is being slid into position under the outer wall 24. As this movement progresses, ultimately, the toe part 18 can be inserted into the toe portion 22 of the pocket 12. Thereafter, the wedge lock means generally designated 25 is installed to maintain the tooth 213 within its position within the pocket 12.

Figure 2:
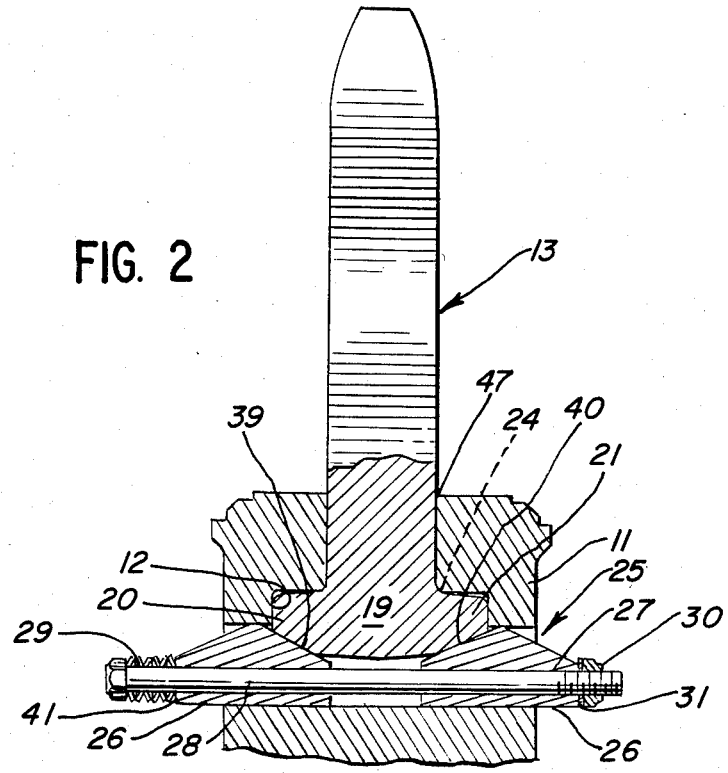
FIG. 2 is a fragmentary sectional view seen along the sight line 2—2 applied to FIG. 1.
Figure 4:
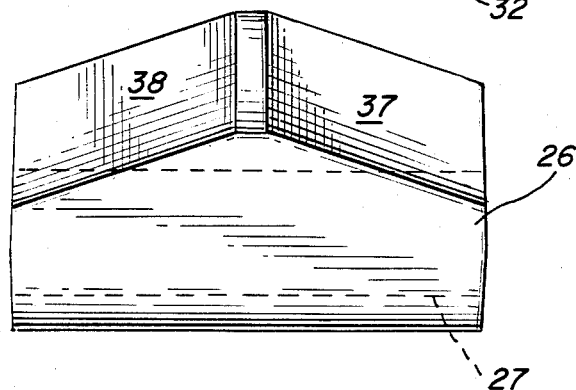
FIG. 4 is an end elevational view of one of the locking wedges employed in the practice of the invention.
Figure 5:
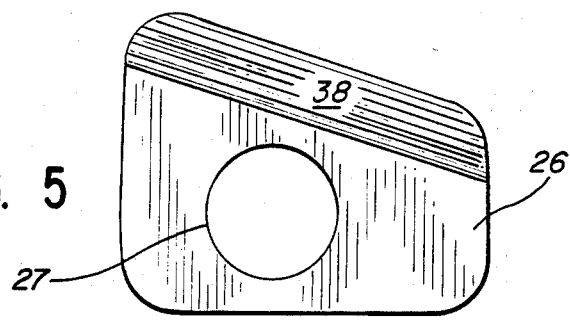
FIG. 5 is a side elevational view of the wedge lock of FIG. 4.

As seen in FIG. 2, the lock means 25 includes a pair of wedge locks 26 which are identically constructed but which bear against different of the integral flanges 20 and 21. The wedge locks 26 are seen in larger scale and greater detail in FIGS. 4 and 5. Each wedge lock 26 is equipped with a transverse bore 27 into which a bolt 28 is inserted. The bolt is equipped with spring means in the form of 6 Bellville washers 29 (still referring to FIG. 2—and in the left hand portion thereof) while the bolt 26 is maintained in place by an ESNA type lock nut 30 bearing against a flat washer 41 on the threaded end of the bolt 28.

The sprocket body 11 is equipped with passages as at 32 (designated only in FIG. 3) for the receipt of the wedge locks 26. The wedge locks are equipped with inclined top faces as at 37 and 38 and thus are adapted to bear against the similarly inclined wedge faces on the underside of the flanges 20 and 21 as at 39 and 40 (see FIG. 2). Further, the wedge faces 37 and 38 are inclined in the chain force direction as can be appreciated from the inclination of the surface 38 in FIG. 5.

SUMMARY OF STRUCTURE

The sprocket 11 consists of a body which is basically cylindrical in shape with pockets 12 in the periphery to accept teeth 13 and locking means 25.

The teeth 13 in the inner end portion 15 are partially shaped an inverted T—as provided by flanges 20 and 21. The cross portion of the T, i.e., flanges 20, 21 slides under shoulders developed by wall 24 in the sprocket body pocket 12.

The chain pull on the teeth 13 locks the teeth into the pockets so that the locking means only function to retain the teeth while in disengagement with the chain and from miscellaneous unexpected forces. Locking means consists of two wedges 26 each with a bolt hole extending through the center so that a bolt 28 may be inserted and used to pull the wedges together to raise up the heel 19 of the tooth and lock it into the body pocket. The bolt is made up of 6 paired Bellville washers installed against the bolt head and with each pair of cups together. These are retained against the head by a pronged clip washer 41 (see the lower left hand portion of FIG. 2).

The bolt 28 is inserted through the wedge locks 26 and a flat washer 31 and an ESNA nut 30 complete the assembly. The bolt if tightened to working load of the bolt or till the Bellville washers are flatened. The Bellville washers will take up any ply that develops as the teeth seat into the body pockets.

DESCRIPTION OF TOOTH CHANGE

The conveyor utilizing the chain entrained on the sprocket 11 is stopped. A tooth fee of the conveyor chain is selected. The retainer bolt 28 is removed. A bar can be inserted through the wedge lock 26 on the near side and butted up against the wedge lock on the far side. A hammer is used to drive out the far wedge lock 26. The near wedge lock is removed in a like manner.

The tooth is then tipped so that it clears the sprocket body and then is removed from the pocket 12. After the pocket is cleared of any debris and cleaned, a new tooth is inserted in the direction illustrated in FIG. 3. Thereafter, the wedge locks 26 are inserted under the heel of the tooth and the bolt with the Bellville washer intact on the head end is installed. Thereafter, the ESNA nut is tightened to approximately 250 foot pounds or until the Bellville washers are flattened. The conveyor is then jogged until the next tooth is free from the chain and the procedure is repeated until all necessary teeth are changed.

The foregoing procedure illustrates that teeth may be replaced with new teeth but at a time when the shaft and bearings do not have to be removed from the conveyor. Also, the teeth are changed only one at a time so that the chain does not have to be removed from the sprocket. The teeth may be made in any cast alloy since no machining is required. This makes it possible to make the teeth from very abrasive resistant material. The only machining required on this sprocket is the bore. Thus, the sprocket body may be made from any reasonably strong steel which is machinable—it does not have to be wear resistant.

The inventive sprocket assembly differs from the traditional replaceable tooth sprockets which have teeth which are inserted in such a way into the body that the chain forces acting through them has little or no tendency to assist in locking the teeth into the body. The inventive sprocket teeth are held in the sprocket body by the force of the chain acting on them. It can be appreciated from a consideration of FIG. 1 that the chain force drives the tooth 13 against the arcuate wall 42 defining the forward end of the toe portion 22 of the pocket 12.

This action is aided by the action of the wedge lock means 25 inasmuch as the wedge locks 26 urge the tooth 13 into the locked position so that during the period the chain force is exerted on the tooth, there is both the chain force and the wedge action holding the tooth in place. Alternatively, it can be considered that the invention always has the wedge locks urging the tooth into the lock position and during the chain contact with the teeth, both forces act to hold the tooth into the locked position in the body.

Further, the Bellville spring washers urge the wedge locks against the wedge surfaces of the heel to avoid any loosening of the seat of the tooth inner end 15 within the pocket 12.

Further, the traditional tooth retainer pulls the tooth at right angles to the force from the chain so that the chain force and locking retainer do not complement each other.

It is contemplated that the tooth 13 will "wear" itself into position within the pocket 12 and this is facilitated by the provision of the arcuate end surface 43 provided on the toe part 18 of the tooth 13—in combination with the corresponding arcuate surface 42—both of which are generated about a center of curvature lying rearwardly of the tooth.

Further, to facilitate the wearing end of the seat of the tooth in the sprocket pocket, I provide a wear pad as at 44 (see the central left hand portion of FIG. 1) and which bears against a part of the bottom wall 45 of the pocket 12. A counterpart pad 46—see the central portion of FIG. 1—is provided on the upper or radially outward face of the flanges 20 and 21 thus bearing against the walls 24. As wear occurs, the dual inclination of the wedge lock faces 37 and 38 cooperate in engaging the radially inward undersurfaces of the flanges 20 and 21 to urge the tooth counterclockwise as seen in FIG. 1 and thus into continued firm seated condition. More particularly, the dual inclination of the faces 37 and 38 insures that the wedge becomes firmly seated when installed so that it will not slip after assembly and become loose. The angle between the two bearing faces as seen radially tends to urge the wedge toward the large end and seat it against the sprocket body circumferentially, thus assuring it will not move further in this direction after assembly. Further, stabilization or firm seating of the heel of the tooth can be accomplished by increasing the angle of the wedge circumferentially and applying a mating angle to the wedge angle on the tooth heel, thus encouraging the heel radially and circumferentially toward the toe of the tooth.

Optimally, the cooperating wedge faces on the flanges 20, 21 and the surfaces 37, 38 or the wedge locks 26 are disposed at an angle from about 10 degrees to about 40 degrees to utilize most effectively the coefficient of friction of steel and to prevent inadvertent slippage of the arts relative to each other. Also, it will be noted that the pocket 12 is generally L-shaped, viz., the toe part 22 being angularly related to the heel part 23 and with the opening 17 being of greater axial extent than the slot 47 provided for the outer end 14 of the tooth 13 (see FIG. 2).

While in the foregoing specification, a detailed description of an embodiment of the invention has been set down for the purpose of illustration, many variations of the details herein given may be made by those skilled in the art without departing from the spirit and scope of the invention.

I claim:

1. A sprocket assembly with replaceable teeth for engaging a chain comprising a generally cylindrical sprocket body having a cylindrical periphery and adapted to be axially mounted on a rotatable shaft and having a plurality of equally spaced tooth receiving pockets in the cylindrical periphery thereof, each of said pockets extending generally circumferentially of said body and having a toe portion open to said cylindrical periphery and heel portion communicating with said toe portion and spaced rearwardly thereof relative to the direction of chain force applied to said sprocket assembly, said heel portion being partially defined by an outer wall separating said heel portion from said cylindrical periphery, said body being equipped with axially extending passages, one on each side of said heel portion, a tooth removably mounted in each pocket having a toe part and a heel part for mounting respectively in each of said pocket toe and heel portions and having a chain engaging contour radially outward of said parts, and wedge lock means in said passages for engagement with said tooth heel part to urge said tooth toe part into engagement with said socket toe portion whereby the chain force tends to seat said tooth in said pocket.

2. The structure of claim 1 in which each tooth heel part is equipped with axially extending flanges.

3. The structure of claim 2 in which said flanges are equipped with axially disposed wedge faces for cooperation with said wedge lock means.

4. The structure of claim 3 in which wedge faces are also inclined circumferentially.

5. The structure of claim 3 in which said wedge lock means includes a pair of wedge lock members resiliently urged together.

6. The structure of claim 5 in which a bolt is inserted through said wedge lock members and said resilient urging is provided by Bellville washers.

7. A sprocket assembly with replaceable teeth for engaging a chain comprising a generally cylindrical sprocket body adapted to be axially mounted on a rotatable shaft and having a plurality of equally spaced tooth receiving pockets in the cylindrical periphery thereof, each of said pockets extending generally circumferentially of said body and having a toe portion open to said cylindrical periphery and heel portion communicating with said foot portion and spaced rearwardly thereof relative to the direction of chain force applied to said sprocket assembly, said heel portion being partially defined by an outer wall separating said heel portion from said cylindrical periphery, said body being equipped with axially extending passages, one on each side of said heel portion, a tooth removably mounted in each pocket having a toe part and a heel part for mounting respectively in each of said pocket toe and heel portions and having a chain engaging contour radially outward of said parts, said tooth heel part being equipped with axially extending flanges engaging said outer wall, and a wedge lock in each passage engaging one of said flanges, and a spring loaded bolt extending through said wedge locks resiliently urging said wedge locks toward each other.

8. The structure of claim 7 in which said pocket toe and heel portions are angularly inclined toward each other to provide angularly related inner walls.

9. The structure of claim 8 in which said pocket toe portion and tooth toe part are equipped with arcuate confronting walls.

10. A replaceable tooth for a chain and sprocket assembly comprising a unitary member having radially related outer and inner ends, said outer end being contoured to engage said chain and said inner end being adapted to be removably received within an outwardly facing pocket in the periphery of a generally cylindrical sprocket mounted on an axially extending rotatable shaft, said inner end being equipped with circumferentially related toe and heel parts, said heel part being circumferentially rearward of said toe part relative to the direction of the force applied to said sprocket by said chain, said toe and heel parts being so arranged and constructed that a locking force on said heel part cooperates with said chain force in urging said toe part into seating engagement with said pocket.

11. The structure of claim 10 in which said heel part is equipped with axially-extending integral flanges, said flanges being equipped with inclined surfaces on their radially inner faces.

12. The structure of claim 11 in which said toe part is equipped with a generally radially extending surface facing forwardly thereof.

13. The structure of claim 12 in which said generally radially extending surface is generally acruate about a center of curvature spaced rearwardly thereof.

14. The structure of claim 11 in which said inclined surfaces are both axially and circumferentially inclined.

15. The structure of claim 11 in which said inclined surfaces are at an angle of from about 10 degrees to about 40 degrees relative to the axis of rotation of said sprocket assembly to utilize the coefficient of friction of steel against inadvertent slippage.

16. A replaceable tooth for a chain and sprocket assembly comprising a unitary member having radially related outer and inner ends, said outer end being countoured to engage said chain and said inner end being adapted to be removably received within an outwardly facing pocket in the periphery of a generally cylindrical sprocket mounted on an axially extending rotatable shaft, said inner end being equipped with circumferentially related toe and heel parts, said heel part being circumferentially rearward of said toe part relative to the direction of the force applied to said sprocket by said chain, said toe part having a forward end spaced from said heel part and radially inward and outward portions, said toe and heel parts being angularly related to each other with said heel part being equipped with axially extending flanges having radially inner and outer faces, said flanges on their radially inner faces being equipped with inclined surfaces, said toe part being equipped with a generally radially extending face at its forward end.

17. The structure of claim 16 in which integral wear pads are provided on the radially outer faces of said flanges and the radially inward portion of said toe part.

* * * * *